Dec. 12, 1967     J. J. ZOLOTAREVSKY     3,357,051
DIE FOR EXTRUSION OF DOUBLE-WALL OF "TUBE-IN-TUBE" TYPE
Original Filed June 25, 1964

United States Patent Office 3,357,051
Patented Dec. 12, 1967

3,357,051
DIE FOR EXTRUSION OF DOUBLE-WALL OF "TUBE-IN-TUBE" TYPE
Jakov Juljevich Zolotarevsky, Moscow, U.S.S.R., assignor to Gosudarstvenny Nauchno-Issledovatelsky Institute Plasticheskykh Mass
Continuation of application Ser. No. 377,980, June 25, 1964. This application Jan. 9, 1967, Ser. No. 608,226
8 Claims. (Cl. 18—14)

ABSTRACT OF THE DISCLOSURE

Die for extruding concentric cylinders including a mandrel encircled by a bushing supported by a structure such that two concentric annular spaces are formed, the bushing having a discharge end with axial slots communicating the annular spaces in a limited zone. The mandrel and bushing have a reduced taper and are inclined relative to each other.

---

This application is a continuation of application, Ser. No. 377,980, filed June 25, 1964, and now abandoned.

This invention relates to a die for extruding doublewall plastic tubes of the "tube-in-tube" type, said tubes being interconnected by a number of bridges.

The conventional double-wall thermoplastic tubes are arranged adjacent to each other and interconnected by a single bridge. These tubes are used for delivering liquid while discharging waste.

These tubes cannot be used at lower temperatures due to the low heat resistance of plastics, inasmuch as tubes containing frozen liquids cannot be heated by a torch flame.

Should it be necessary to convey and discharge a number of liquids, each liquid will require a separate tube which involves much material. For handling liquids at higher pressures, the low strength of plastic requires walls of considerable thickness which results in an increased weight of the tube, a greater consumption of material and a drastic reduction in the efficiency of the tube-producing equipment since due to the poor heat conductivity of plastics, the cooling of the heated extruded material will require much time.

An object of the present invention is to provide a die for use with extruder that will make it possible to produce double-wall plastic tubes arranged one within the other and interconnected by several bridges along the entire length.

Another object of the invention is to reduce the material consumption for producing plastic tubing to handle liquids at higher pressures.

The invention allows conveying of a number of liquids by means of a single-tube piping.

The invention also provides for heating or cooling of the liquid conducted in the inner tube.

The present invention is particularly directed to a die for producing double-wall plastic tubes of the "tube-intube" type interconnected by a number of bridges.

In accordance with the invention, this is achieved by forming two concentric annular spaces which are adapted for being fed with heated extruded material, said spaces being in communication via spaced slots adjacent the outlet of the die.

Figure 1:
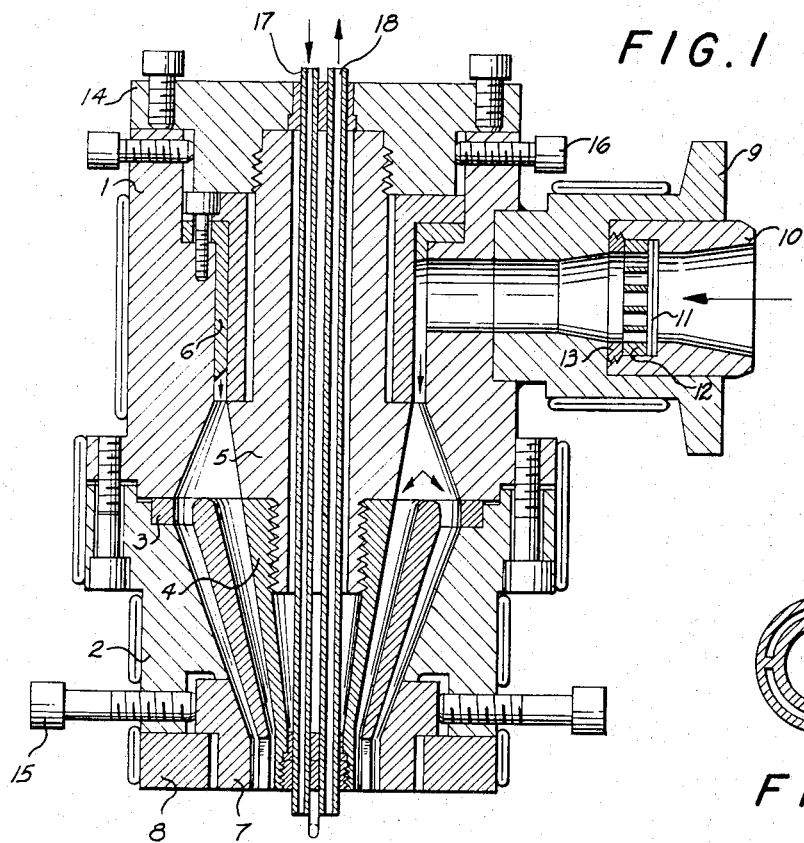
Figure 2:
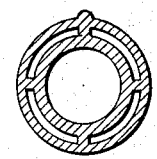
Figure 3:
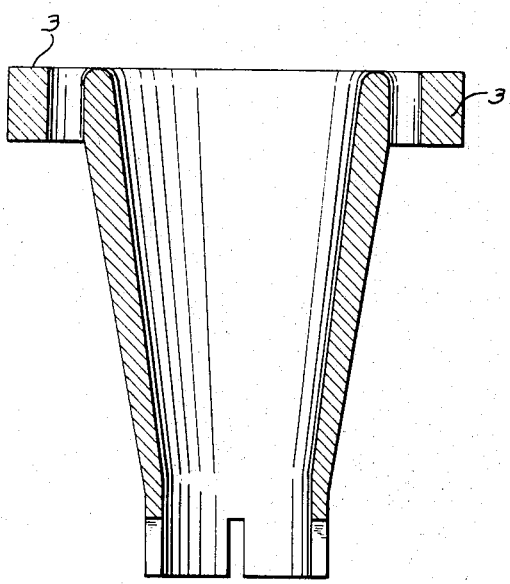
Figure 4:
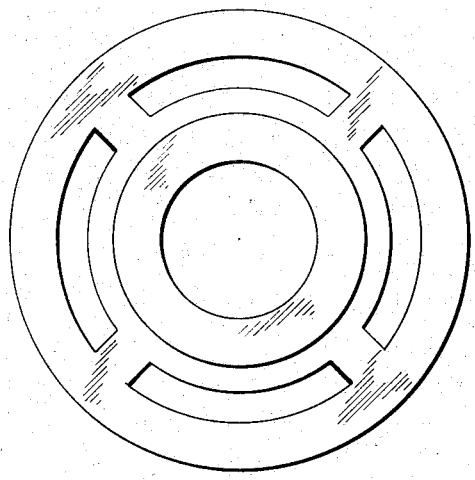

Other objects and advantages of the invention will be apparent from the following description taken in conjunction with the accompanying drawings, wherein FIG. 1 is a longitudinal section of the extruder die according to the invention, FIG. 2 is a cross-section of a tube produced by the die, FIG. 3 is a longitudinal section of a bushing of the die, and FIG. 4 is a top view of the bushing.

The die comprises the following main components: a die base with an upper portion 1 and a lower portion 2. A flange 3 is fitted between portions 1 and 2 and is integral with a circular tapered bushing or liner, the said liner having at the lower end of the tapered portion, a cylinder with a number of slots or apertures as seen in FIG. 3. Mounted in the die base is a mandrel composed of two interconnected portions—an upper portion 5 and a lower portion 4. The upper portion of the die accommodates a dummy block 6 for guiding heated extruded material; the lower portion accommodates a back-up plate 7 and a lock ring 8. The die is secured to the extruder by means of a liner 9 and a bushing flange 10 in which are fastened filter screens 11, a sleeve 12 and a lock ring 13. The upper portion of the die is provided with a cover 14.

The heated material from the extruder passes through the filtering screens 11, the sleeve 12 and is directed by the block 6 to the liner 3. Thereinafter, via two annular grooves formed between the portion 2 and the liner 3, and the mandrel 4 and the liner 3, the extruded material reaches the circular grooves at the outlet of the die wherein the two concentric tubes are finally formed. The thickness of the walls of the outside tube is controlled by adjusting the back-up plate 7 and screws 15 whereas the adjustment of the mandrel portions 4, 5 and screws 16 are used to control the thickness of the outside tubes.

The bridges between the tubes are produced by the apertures in the lower cylindrical portion of the liner 3.

Sizing and cooling of the outside tube is performed by the known method of employing an outside sizing die and applying vacuum and cooling bath. The inside tube is also provided with a cooling system consisting of pipes 17 and 18.

Double-wall plastic tubes produced by action of the extruder die of the claimed construction are used, in particular, for conveying cold or hot liquid, the outside tube and the air spacing in-between the tubes serving as insulation.

The space between the inside and outside tubes divided by the bridges may be utilized for pumping hot liquid with an object to heating liquid that has become frozen in the inner tube or for passage of cold liquid to prevent the liquid conveyed in the inside tube from becoming overheated.

It should be noted that the double wall of the bridged-connected tubes ensures a strength required of the tube, the consumption of the plastic being considerably reduced. The increase in the tube strength is obtained not so much by the construction offered by rather by the availability of the two additional cooled surfaces; in the case of the conventional single-wall tube, the outside and inside surfaces perform the work whereas in the case of the double-wall tube there are four smooth surfaces that take a great deal of load caused by hydrostatic pressure inside the tube.

Though the present invention is described in connection with the preferred embodiment, alterations and modifications may be made without departing from the spirit and scope of the invention that will be easily understood by those skilled in the art.

I claim:

1. A die comprising a mandrel, a bushing encircling the mandrel to define an annular space therebetween, means supporting said bushing and surrounding the same to define a second annular space which encircles the first annular space, said bushing including a lower end portion having a plurality of spaced slots therein establishing communication between the annular spaces in restricted zones, and means for supplying extruded material into said annular spaces to form a tube having spaced walls corresponding to said annular spaces and defining respective conduits adapted for the isolated flow of respective fluids, and bridges connecting said walls in correspondence with said slots.

2. A die as claimed in claim 1 wherein said mandrel and bushing have reduced taper and are inclined relative to one another in a direction away from the means which supplies extruded material to define narrowing annular spaces.

3. A die as claimed in claim 2 wherein said lower end portion of the bushing is cylindrical.

4. A die as claimed in claim 3 wherein the mandrel includes a cylindrical portion coaxial with the cylindrical portion of the bushing to produce an inner wall for the tube which is cylindrical.

5. A die as claimed in claim 4 wherein said means which surrounds the bushing includes a cylindrical portion coaxial with the cylindrical portion of the bushing.

6. A die as claimed in claim 5 comprising means for adjusting the cylindrical portion of the means surrounding the bushing to vary the annular space therebetween to control the thickness of the outer wall of the tube.

7. A die as claimed in claim 6 comprising means for engaging the mandrel to vary the radial position thereof relative to the surrounding bushing to control the thickness of the inner wall of the tube.

8. A die comprising a mandrel, a bushing encircling the mandrel to define an annular space therebetween, means supporting said bushing and surrounding the same to define a second annular space which encircles the first annular space, said bushing including a cylindrical discharge end portion having a plurality of spaced axially disposed and open ended slots therein establishing communication between the annular spaces in restricted zones, and means for supplying extruded material into said annular spaces at a location spaced from the discharge end portion to form a tube having spaced walls corresponding to said annular spaces and defining respective conduits adapted for the isolated flow of respective fluids, and bridges connecting said walls in correspondence with said slots, said mandrel and bushing having reduced taper and being inclined relative to one another in a direction away from the means which supplies extruded material to define narrowing annular spaces, the mandrel including a cylindrical portion coaxial with the cylindrical portion of the bushing to produce an inner wall for the tube which is cylindrical, said means which surrounds the bushing including a cylindrical portion coaxial with the cylindrical portion of the bushing, and means for adjusting the cylindrical portion of the means surrounding the bushing to vary the annular space therebetween to control the thickness of the outer wall of the tube.

References Cited
UNITED STATES PATENTS

| | | | |
|---|---|---|---|
| 938,047 | 10/1909 | Fish. | |
| 2,788,543 | 4/1947 | Dinsch | 18—14 |
| 3,038,202 | 6/1962 | Harkenrider | 18—14 |
| 3,221,372 | 12/1965 | Lieberman | 18—14 |
| 3,275,725 | 9/1966 | Utz. | |

WILLIAM J. STEPHENSON, *Primary Examiner.*